(12) United States Patent
Salmela et al.

(10) Patent No.: US 9,985,967 B2
(45) Date of Patent: May 29, 2018

(54) GATEWAY, CLIENT DEVICE AND METHODS FOR FACILITATING COMMUNICATION BETWEEN A CLIENT DEVICE AND AN APPLICATION SERVER

(71) Applicant: Telefonaktiebolaget L M Ericsson (publ), Stockholm (SE)

(72) Inventors: Patrik Salmela, Espoo (FI); Vesa Lehtovirta, Espoo (FI); Mohit Sethi, Espoo (FI); Kristian Slavov, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/894,142

(22) PCT Filed: May 29, 2013

(86) PCT No.: PCT/SE2013/050618
§ 371 (c)(1),
(2) Date: Nov. 25, 2015

(87) PCT Pub. No.: WO2014/193278
PCT Pub. Date: Dec. 4, 2014

(65) Prior Publication Data
US 2016/0119343 A1    Apr. 28, 2016

(51) Int. Cl.
*H04L 29/06* (2006.01)
*H04W 4/00* (2018.01)
(Continued)

(52) U.S. Cl.
CPC ...... *H04L 63/0876* (2013.01); *H04L 61/6059* (2013.01); *H04L 63/029* (2013.01);
(Continued)

(58) Field of Classification Search
CPC ..... H04W 12/04; H04W 4/005; H04W 12/06; H04L 63/0884; H04L 63/0876;
(Continued)

(56) References Cited

U.S. PATENT DOCUMENTS 6,907,530 B2 * 6/2005 Wang .................. H04L 63/0428
709/224
6,947,404 B1    9/2005 Zalka et al.
(Continued)

OTHER PUBLICATIONS

Ennesser, Francois, "Considerations on M2M Security Interworking with M2M Areas Networks, for M2M Release 2", European Telecommunications Standards Institute, ETSI/M2M(12)21_019, M2M#21 meeting, Sophia Antipolis, Jul. 16-20, 2012, pp. 1-17.
(Continued)

*Primary Examiner* — Mohammad A Siddiqi
(74) *Attorney, Agent, or Firm* — Murphy, Bilak & Homiller, PLLC (57) ABSTRACT

According to a first aspect, it is presented a method, executed in a gateway, the gateway being arranged to facilitate communication between a client device and an application server. The method comprises the steps of: receiving a client request from the client device, the client request comprising at least a portion being bound for the application server; sending an application server request to the application server; receiving an application server response from the application server, the application server response indicating a need to provide authentication; establishing at least one authentication credential using an authentication server for a connection between the client device and the application server; and sending a client response to the client device, the client response being based on the application server response and comprising the at least one authentication credential. An associated gateway,
(Continued)

client device, vehicle, computer program and computer program product are also presented.

16 Claims, 5 Drawing Sheets

(51) Int. Cl.
  *H04W 12/06* (2009.01)
  *H04W 12/04* (2009.01)
  *H04L 29/12* (2006.01)
(52) U.S. Cl.
  CPC .......... *H04L 63/0884* (2013.01); *H04L 67/42* (2013.01); *H04W 4/005* (2013.01); *H04W 12/04* (2013.01); *H04W 12/06* (2013.01); *H04L 63/166* (2013.01)
(58) Field of Classification Search
  CPC ... H04L 67/42; H04L 61/6059; H04L 63/029; H04L 63/166
  See application file for complete search history.

(56) References Cited

U.S. PATENT DOCUMENTS

| | | | | |
|---|---|---|---|---|
| 9,191,208 B2* | 11/2015 | Yagisawa | .............. | H04L 9/3066 |
| 2007/0288754 A1* | 12/2007 | Kaji | ........................ | H04L 67/14 |
| | | | | 713/175 |
| 2009/0176489 A1* | 7/2009 | Ulupinar | ............ | H04W 36/0016 |
| | | | | 455/432.2 |
| 2011/0167160 A1* | 7/2011 | Murakami | ........ | H04L 29/12188 |
| | | | | 709/227 |
| 2011/0188508 A1 | 8/2011 | Hjelm et al. | | |
| 2012/0140764 A1* | 6/2012 | Sheth | .................. | H04L 65/1016 |
| | | | | 370/352 |
| 2012/0265990 A1* | 10/2012 | Liu | ........................ | H04W 12/06 |
| | | | | 713/168 |
| 2012/0331286 A1* | 12/2012 | Choi | ..................... | H04L 9/3263 |
| | | | | 713/156 |
| 2013/0007858 A1* | 1/2013 | Shah | ................... | H04L 63/0815 |
| | | | | 726/6 |

OTHER PUBLICATIONS

Unknown, Author, "3GPP TS 33.220 V12.0.0 (Mar. 2013)", 3rd Generation Partnership Project; Technical Specification Group Services and System Aspects; Generic Authentication Architecture (GAA); Generic Bootstrapping Architecture (GBA) (Release 12), Mar. 2013, pp. 1-92.

Unknown, Author, "ETSI TS 102 690 V2.0.13 (May 2013)", ETSI Technical Specification, Machine-to-Machine communications (M2M); Functional architecture, May 2013, pp. 1-328.

* cited by examiner

GATEWAY, CLIENT DEVICE AND METHODS FOR FACILITATING COMMUNICATION BETWEEN A CLIENT DEVICE AND AN APPLICATION SERVER

TECHNICAL FIELD

The technology relates to facilitating communication between a client device and an application server, and in particular the use of one or more authentication credentials allowing the client device connecting to an application server.

BACKGROUND

Capillary networks allow resource constrained client devices to communicate with application servers, using an intermediate gateway, e.g. connected via a mobile communication network. However, the application server may dictate the use of authentication credentials to allow access.

Conventionally, when a client device connects to the application server via a mobile communication network, credentials related to the mobile communication network, such as 3GPP ($3^{rd}$ Generation Partnership Project) credentials can be used for authentication with the help of an authentication server, which may e.g. implement a Bootstrapping Server Function (BSF) when GBA (Global Bootstrapping Architecture) is used.

However, in capillary networks, the client devices are often resource constrained devices that may not be able to handle or even store 3GPP credentials securely.

It would be of great benefit if there were to be some way in which client devices of a capillary network could securely connect to application servers.

SUMMARY

An object is to eliminate or at least alleviate the problems of the prior art discussed above.

According to a first aspect, it is presented a method, executed in a gateway, the gateway being arranged to facilitate communication between a client device and an application server. The method comprises the steps of: receiving a client request from the client device, the client request comprising at least a portion being bound for the application server; sending an application server request to the application server; receiving an application server response from the application server, the application server response indicating a need to provide authentication; establishing at least one authentication credential using an authentication server for a connection between the client device and the application server; and sending a client response to the client device, the client response being based on the application server response and comprising the at least one authentication credential. Since the gateway establishes the one or more authentication credential using the authentication server, the client device is relived from any such task. Moreover, by including this one or more authentication credential in the client response, the client device can establish authenticated communication with the application server. Moreover, the at least one authentication credential is specific for the client device, whereby different client devices can be authenticated separately for the same application server. Furthermore, the client devices might not have the ability to performing the authentication themselves due to an inability to securely store and manage credentials. This inability could be due to lack of resources or a deliberate design choice to not risk having secure storage located in a client device which could be tampered with or stolen.

The step of establishing at least one authentication credential may comprise the use of a generic bootstrapping architecture.

The step of establishing at least one authentication credential may comprise receiving a context identifier from the authentication server, and deriving a shared key.

According to a second aspect, it is presented a gateway arranged to facilitate communication between a client device and an application server. The gateway comprises: a processor; and a memory storing instructions that, when executed by the processor, causes the gateway to: receive a client request from the client device, the client request comprising at least a portion being bound for the application server; send an application server request to the application server; receive an application server response from the application server, the application server response indicating a need to provide authentication; establish at least one authentication credential using an authentication server for a connection between the client device and the application server; and send a client response to the client device, the client response being based on the application server response and comprising the at least one authentication credential.

The instructions to establish at least one authentication credential may comprise instructions to use a generic bootstrapping architecture.

The instructions to establish at least one authentication credential may comprise instructions to receive a context identifier from the authentication server and deriving a shared key.

The gateway may further comprise instructions to generate a new fully qualified domain name, FQDN, for the application server based on an original FQDN for the application server and an identity associated with the client device. In such a case, the instructions to establish comprise instructions to use the new FQDN for identification of the application server. In this way, the authentication credentials generated for this session will be bound to the identity of the client device for which the authentication credentials is generated. Moreover, when the client device uses the new FQDN, the application server can identify the client device by simply analysing the new FQDN.

The instructions to generate a new FQDN may comprise instructions to generate the new FQDN as a subdomain of the original FQDN, and the specification of the new FQDN, in relation to the original FQDN, is based on the identity associated with the client device. In this way, the routing to the application server is not affected and the application server simply needs to be able to handle incoming traffic to the new FQDN. As long as both endpoints know where the data based on the identity associated with the client device identifier is located, the new IPv6 address could be either the source address or destination address.

The gateway may further comprise instructions to: generate a new internet protocol version 6, IPv6, address for the application server based on an original IPv6 address for the application server and an identity associated with the client device. Using the new IPv6 address allows the application server to distinguish between different client devices.

The instructions to generate a new IPv6 address may comprise instructions to generate a new IPv6 address comprising an interface identifier of the new IPv6 address being based on the identity associated with the client device. The interface identifier is a suitable location, using the IPv6 address format, to include information about the identity of the client device.

The identity associated with the client device may comprise an identifier of the client device.

The identity associated with the client device may comprise an identifier of an application executing on the client device. In this way, communication from applications on the same device can be separated securely.

The gateway may comprise instructions to communicate the client request, application server request, application server response and client response using any one or more of the following protocols: Hypertext Transport Protocol and Constrained Application Protocol either protocol being with or without transport layer security.

According to a third aspect, it is presented a gateway comprising: means for receiving a client request from a client device, the client request comprising at least a portion being bound for an application server; means for sending an application server request to the application server; means for receiving an application server response from the application server, the application server response indicating a need to provide authentication; means for establishing at least one authentication credential using an authentication server for a connection between the client device and the application server; and means for sending a client response to the client device, the client response being based on the application server response and comprising the at least one authentication credential.

The means for establishing at least one authentication credential may comprise means for using a generic bootstrapping architecture.

The means for establishing at least one authentication credential may comprise means for receiving a context identifier from the authentication server, and deriving a shared key.

According to a fourth aspect, it is presented a computer program for facilitating communication between a client device and an application server. The computer program comprises computer program code which, when run on a gateway, causes the gateway to receive a client request from the client device, the client request comprising at least a portion being bound for the application server; send an application server request to the application server; receive an application server response from the application server, the application server response indicating a need to provide authentication; establish at least one authentication credential using an authentication server for a connection between the client device and the application server; and send a client response to the client device, the client response being based on the application server response and comprising the at least one authentication credential.

According to a fifth aspect, it is presented a computer program product comprising a computer program according to the fourth aspect and a computer readable means on which the computer program is stored.

According to a sixth aspect, it is presented a method being executed in a client device arranged to set up a connection between the client device and an application server. The method comprises the steps of: sending a client request to a gateway, the client request comprising at least a portion being bound for the application server; receiving a client response from the gateway, the client response indicating a need to provide authentication and comprising at least one authentication credential; generating a new client request based on the at least one authentication credential; and sending the new client request to the gateway intended for the application server.

All the client requests and the client response may be communicated using any one or more of the following protocols: Hypertext Transport Protocol and Constrained Application Protocol, either protocol being with or without transport layer security.

According to a seventh aspect, it is presented a client device arranged to set up a connection between the client device and an application server. The client device comprises: s processor; and a memory storing instructions that, when executed by the processor, causes the client device to: send a client request to a gateway to connect to the application server; receive a client response from the gateway, the client response indicating a need to provide authentication and comprising at least one authentication credential; generate a new client request based on the at least one authentication credential; and send the new client request to the gateway intended for application server, the new client request being based on the at least one authentication credential.

The client device may comprise instructions to communicate the client request and client response using any one or more of the following protocols: Hypertext Transport Protocol and Constrained Application Protocol, either protocol being with or without transport layer security.

According to an eighth aspect, it is presented a client device comprising means for sending a client request to a gateway, the client request comprising at least a portion being bound for an application server; receiving a client response from the gateway, the client response indicating a need to provide authentication and comprising at least one authentication credential; means for generating a new client request based on the at least one authentication credential; and means for sending the new client request to the gateway intended for the application server.

All the client requests and the client response may be communicated using any one or more of the following protocols: Hypertext Transport Protocol and Constrained Application Protocol, either protocol being with or without transport layer security.

According to a ninth aspect, it is presented a vehicle comprising a client device according to the seventh or eighth aspect.

According to a tenth aspect, it is presented a computer program for setting up a connection between the client device and an application server. The computer program comprises computer program code which, when run on the client device, causes the client device to: send a client request to a gateway to connect to the application server; receive a client response from the gateway, the client response indicating a need to provide authentication and comprising at least one authentication credential; generate a new client request based on the at least one authentication credential; and send the new client request to the gateway intended for application server, the new client request being based on the at least one authentication credential.

According to an eleventh aspect, it is presented a computer program product comprising a computer program according to the tenth aspect and a computer readable means on which the computer program is stored.

It is to be noted that any feature of the first, second, third, fourth, fifth, sixth, seventh, eighth, ninth, tenth and eleventh aspect may, where appropriate, be applied to any other of these aspects.

The word 'plurality' in the description and claims is to be interpreted as meaning 'more than one'.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
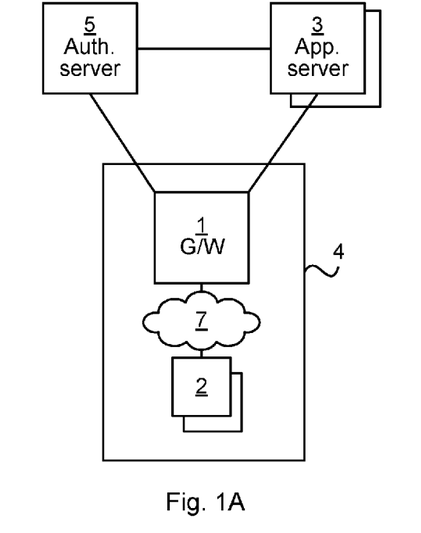
FIGS. 1A-B are schematic diagrams illustrating environments where embodiments presented herein can be applied.
Figure 1B:
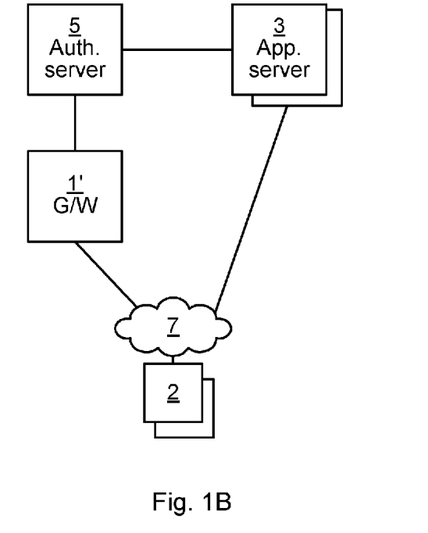

FIGS. 1A-B are schematic diagrams illustrating environments where embodiments presented herein can be applied. A number of client devices 2 are connected via a network 7 to a gateway 1. Each client device communicates on occasion with one or more of a set of application servers 3. The connection between the client devices 2 and the gateway 1 can be wireless, e.g. using ZigBee, Wi-Fi (IEEE 802.11), Bluetooth, etc., or wired, e.g. using Ethernet, USB, a serial or parallel connection, etc. The client devices are optionally integrated in any suitable type of host device, such as a vehicle or a home electronics device e.g. media player, camera, television, etc.

The gateway 1 is in turn connected to one or more of the applications servers 3 to allow communication between the client devices 2 and the application servers 3. The application servers are any suitable server and can e.g. implement a Network Application Function (NAF) as defined in 3GPP TS 33.220 V12.0.0.

The connection between the gateway 1 and the application server 3 and the authentication server 5 may occur over an IP based network being wired based, wireless and/or using a mobile communication network. The mobile communications network may e.g. comply with any one or a combination of 3GPP ($3^{rd}$ Generation Partnership Project) standards such as LTE (Long Term Evolution) or UMTS utilising W-CDMA (Wideband Code Division Multiplex), or other standards such as CDMA2000 (Code Division Multiple Access 2000). The gateway 1 along with the network 7 and the client devices are collectively called a capillary network. The connection between the gateway 1 and the application servers 3 and the authentication server 5 may also include a connection through a wide area network such as the Internet, allowing great geographic separation between the application servers 2, authentication server 5 and the gateway 1.

The application server 3 may in some situations require that a connection to a client device 2 is to be encrypted. A situation with a client device 2 without a gateway will now be described first.

The client device 2 then needs to have 3GPP credentials (or equivalent) such as in a USIM (Universal Subscriber Identity Module). The USIM can be provided using a physical card (such as a UICC, Universal Integrated Circuit Card) or by an electronically transferable subscriber identity module such as an MCIM (Machine Communications Identity Module). The client device 2 can then use the 3GPP credentials (or equivalent credentials) to obtain credentials using the authentication server 3 for authenticating itself towards the application server 3. The client device 2 is then authenticated by the application server 3 using the authentication server 5 e.g. in accordance with the Generic Bootstrapping Architecture (see 3GPP TS 33.220 V12.0.0). The mutual authentication between the client device 2 and the application server 3 is based on the combination of the mutual authentication between the authentication server and the device as well as the trust relationship between the authentication server 5 and the application server 3. Hence, if the application server 3 does not have a trust relationship with the authentication server 5, it will not be able to communicate with the authentication server 5 to get the keys and thus cannot be authenticated by the client device 2.

The authentication server 5 can e.g. implement a Bootstrapping Server Function (BSF) where, using a mutual authentication between the client device and the BSF, a mutual authentication of the client device 2 and the application server 3 is also achieved. The client device can connect to the application server 3 and provide a context identifier being B-TID (Bootstrapping transaction identifier), which the application server 3 can use to query the authentication server 5 for the associated key. The result of this is that both the application server 3 and the client device 2 now share a secret key that can be used for security functions.

However, in many cases, the client devices 2 are constrained devices, such as sensor devices or actuator devices, with low processing power, limited access to secure storage and minimal or no user interface. Such client devices might not have the resources and capabilities to store and handle authentication credentials for secure communication with the application servers 3.

According to embodiments presented herein, when there is the need to utilize 3GPP based services from the constrained devices in the capillary network, e.g. through the Generic Bootstrapping Architecture (GBA), the client devices are assisted by the gateway 1. The gateway 1 can act as a proxy between the client devices 2 and the application servers 3, in practice identifying and authenticating the capillary network to the application server 3. As is explained in more detail below, this not only allows such a resource limited client device 2 to connect to an application server 3 using the 3GPP credentials of the gateway 1, but also allows such a connection to be secure in relation to other client devices connecting to the same application server 3 using the same gateway 1.

The gateway 1 can be an HTTP (HyperText Transfer Protocol) proxy or a COAP (Constrained Application Protocol) proxy. The gateway 1 can be an explicit proxy, whereby the client device 2 is aware of the gateway 1. Alternatively, the gateway 1 is an implicit proxy, whereby the client device 2 is unaware of the gateway 2.

Figure 2:
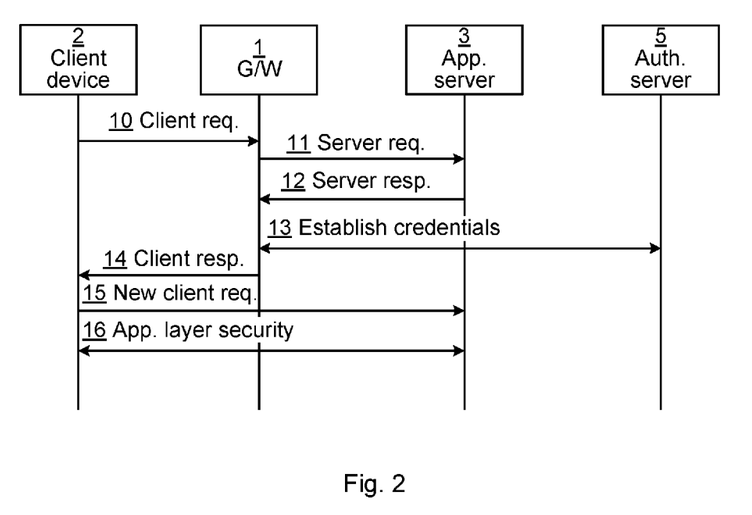
FIG. 2 is a sequence diagram illustrating an embodiment which can be applied in the environment shown in FIG. 1A.

FIG. 2 is a sequence diagram illustrating an embodiment which can be applied in the environment shown in FIG. 1A.

Initially, the client device 2 sends a client request 10 to the gateway 2. The client request 10 can e.g. be an HTTP request or a COAP request. The client request 10 is a request bound for the application server 3. When the gateway 1 is an implicit proxy, the client request 10 is bound for the application server itself and the gateway only acts as a router of the client request. When the gateway 1 is en explicit gateway, the client request 10 comprises at least a portion which is bound for the application server, where the header of the client request can be modified to have the target address of the application server 3.

The gateway 1 then sends a server request 11, based on the client request 10, to the application server 3. The server request 11 can also be an HTTP request or a COAP request, reflecting the type of the client request 10. When the gateway 1 is an implicit proxy, the server request 11 is identical to the client request 10.

The application server 3 responds to the server request 11 with a server response 12 to the gateway 1. The server response 12 is of the same type as the server request 11, i.e. HTTP or COAP, respectively. Also, the server response here indicates a need to provide authentication. For instance, in the case of HTTP, the server response can include an HTTP status code of 401 "unauthorized", indicating that authentication is needed.

The gateway 1 then establishes at least one authentication credential (e.g. Ks_NAF and B-TID described below with reference to FIG. 6D) using the authentication server, which is later to be used for a connection between the client device 2 and the application server 3. This is explained in more detail with reference to FIG. 6D below.

Once the at least one authentication credential has been established, the gateway 1 sends a client response 14 to the client device 1. The client response 14 is essentially the server response 12 (e.g. an HTTP 401 response) with the target address modified (when necessary) to reach the client device 2. Consequently, also the client response 14 indicates a need to provide authentication. Moreover, the client response 14 comprises the at least one authentication credential. When the gateway is an implicit proxy, it acts as an intercepting node, whereby the client response 14 includes all of the server response, but also the at least one authentication credential. Optionally, the client response also comprises information on how to use the credentials, for instance information regarding what security algorithm to be used. Especially in a non-GBA scenarios (or evolved GBA scenario) it might be that either server (application server or authentication server) indicates what security algorithm is to be used, along with the key to the gateway. In such a case, the gateway also indicates this information to the client device for the client device to be able to initiate a secured connection to the application server.

The client device 2 understands from the client response 14 that there is a need to provide authentication to connect to the application server 3. The client device then generates and sends a new client request 15 to the gateway, bound for the application server 3. The new client request 15 then also includes a context identifier of the at least one authentication credential for authentication with the application server 3. The Ks_NAF, on the other hand, is used to answer a challenge received in the client response 14. In other words, the Ks_NAF is not sent in the new client request 15, but rather used for generating a response which is included in the new client request 15.

After the connection is established between the client device 2 and the application server 3, application layer security is then 16 used for further communication between the client device 2 and the application server 3.

Figure 3:
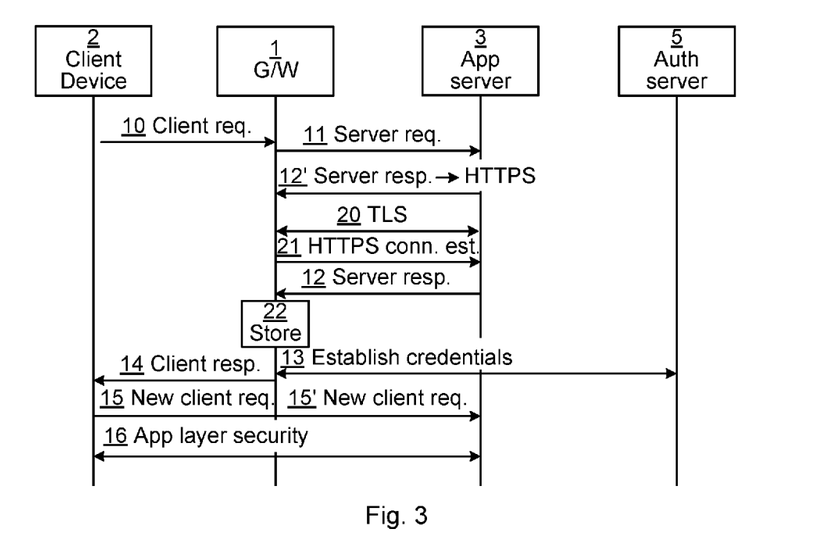
FIG. 3 is a sequence diagram illustrating an embodiment which can be applied in the environment shown in FIG. 1A.

FIG. 3 is a sequence diagram illustrating an embodiment which can be applied in the environment shown in FIG. 1A. There are many similarities to the embodiment illustrated in FIG. 2 and only differences to that embodiment will be described here. However, FIG. 3 illustrates an embodiment where TLS is used, which is not supported by the embodiment illustrated in FIG. 2. TLS can be a requirement dictated by the application server, as shown below.

In this embodiment, the application server 3 sends a redirect server response 12' as a response to the server request 11. The redirect server response 12' indicates a redirection to HTTPS, e.g. using an HTTP 302 response message, or COAP with TLS (Transport Layer Security) or DTLS (Datagram Transport Layer Security).

Transport layer security using TLS or DTLS 20 is then established between the gateway 1 and the application server 3, e.g. as defined in RFC 5246 version 1.2. Once TLS or DTLS is established, the gateway 1 sends an HTTPS connection establishment 21 to the application server which then responds with the server response 12, e.g. being an HTTP 401 response. The gateway 1 then stores 22 the server response 12.

Once the credentials have been established with the authentication server, the gateway 1 sends a client response 14 to the client device 2 which client response 14' comprises the stored server response 12 and the authentication credentials.

The new client request 15 received by the gateway 1 from the client device is then forwarded as a new client request 15' over TLS or DTLS to the application server.

Since the gateway 1 here is an endpoint in the TLS or DTLS communication, the client device 2 is relived from having to perform any handshake and encryption/decryption for TLS or DTLS, which may be resource heavy for a resource limited client device 2.

Figure 4:
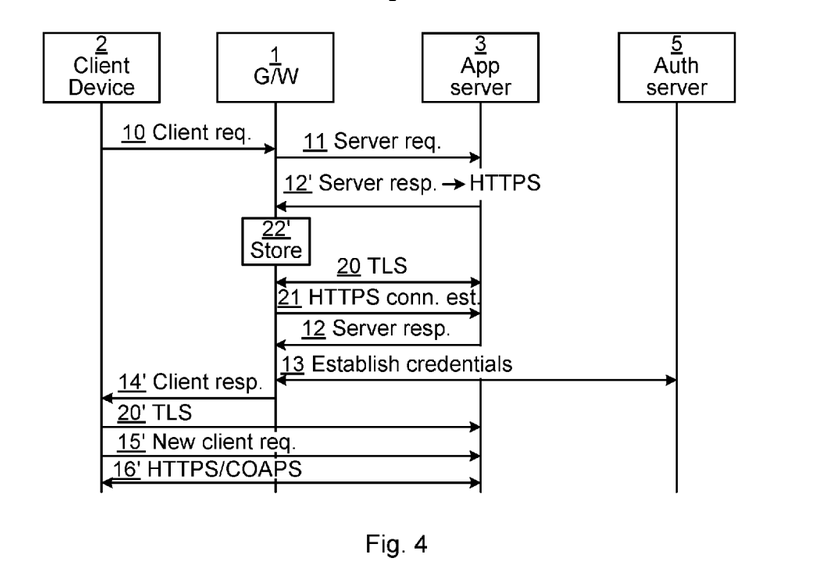
FIG. 4 is a sequence diagram illustrating an embodiment which can be applied in the environment shown in FIG. 1A.

FIG. 4 is a sequence diagram illustrating an embodiment which can be applied in the environment shown in FIG. 1A. There are many similarities to the embodiment illustrated in FIG. 3 and only differences to that embodiment will be described here. This embodiment allows the client device to establish transport layer security with the application server.

In this embodiment, the gateway 1 stores 22' the redirect server response 12' instead of the server response 12 as is the case for the embodiment shown in FIG. 3.

Once the credentials have been established with the authentication server, the gateway 1 sends a client response 14' to the client device 2 which client response 14' comprises the stored redirect server response 12' and authentication credentials. The client device 2 then establishes transport layer security using TLS or DTLS 20' with the application server. This relieves the gateway of having to be the TLS (or DTLS) end point and thus encrypt/decrypt messages between the client device 2 and the application server. On the other hand, this embodiment requires that the client device 2 has sufficient resources (processing power and power supply) to be able to perform the required encryption/decryption.

Figure 5:
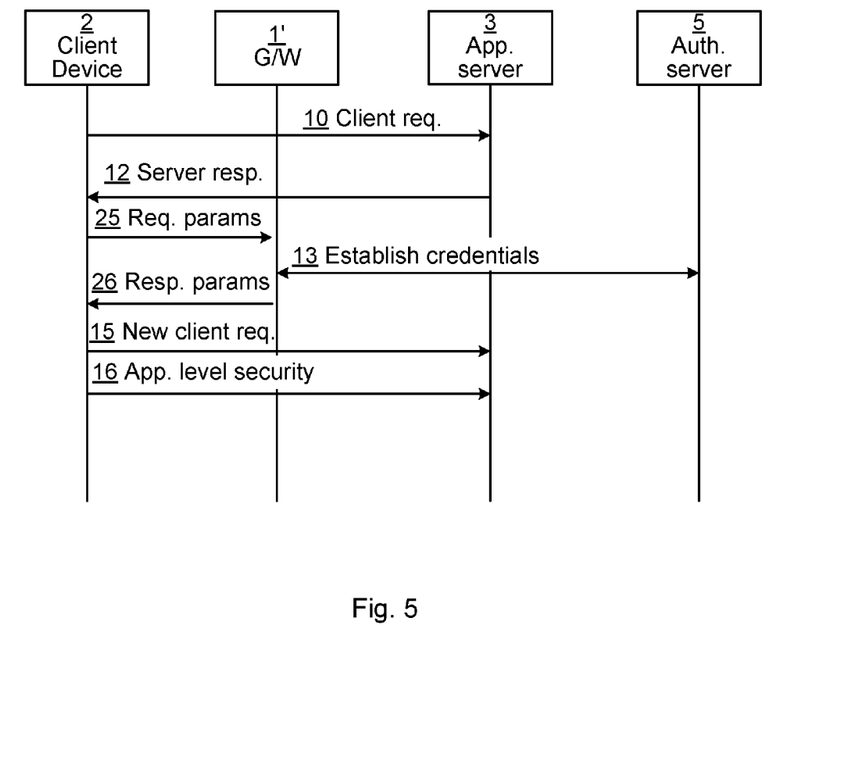
FIG. 5 is a sequence diagram illustrating an embodiment which can be applied in the environment shown in FIG. 1B.

FIG. 5 is a sequence diagram illustrating an embodiment which can be applied in the environment shown in FIG. 1B. This embodiment allows device to connect to an application server requiring the use of the authentication server (e.g. using GBA) without needing to use authentication functionality of an intermediate gateway being a proxy for the communication between the client device 2 and the application server 3.

There are many similarities to the embodiment illustrated in FIG. 2 and only differences to that embodiment will be described here.

In this embodiment, the gateway 1' is slightly different from the gateway 1 of FIG. 2 (and FIG. 1A) in that the gateway 1' does not act as a proxy for the communication between the client device 2 and the application server 3.

Hence, neither the client request 10 nor the server response 12 pass through the gateway 1'. The client device is made aware of a need to provide authentication. For example, in GBA, it is defined that the application server 3 can indicate that it supports GBA in the server response 12 (e.g. HTTP 401 response). Moreover, it might be that a client device cannot rely on its regular gateway/proxy to perform authentication to any application server providing the server response, When the client device 2 is made aware of the need to provide authentication, e.g. by receiving a HTTP 401 message, the client device 2 sends a request parameters message 25 to the gateway 1' in order to get the at least one authentication credential. This then triggers the establish credentials 13, after which the gateway 1' sends response parameters 26 comprising the at least one authentication credentials. Optionally, the communication between the client device 2 and the gateway 1' is encrypted, since in some embodiments, this communication may pass through untrusted networks.

In this embodiment, since the gateway does not need to act as a proxy, the gateway 1' can be located anywhere in a network as long as the gateway 1' has connectivity to the client device 2 and the authentication server 5. Optionally, a capillary network comprising the client device 2 may still have its own gateway which is used for connectivity, even if such a gateway is not used for authentication. In one embodiment, the client device connects to a network for connectivity e.g. using Wi-Fi or similar.

Figure 6A:
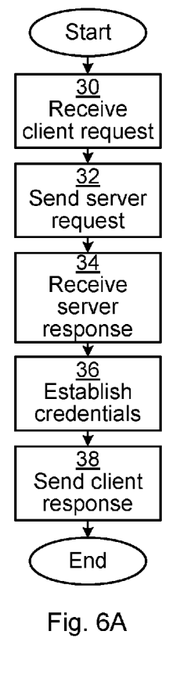
FIGS. 6A-D are flow charts illustrating methods for facilitating communication between the client device and application server of FIG. 1A.

FIG. 6A is a flow chart illustrating one embodiment of a method for facilitating communication between a client device, being one of client devices 2 of FIG. 1A, and an application server being one of the application servers 3 of FIG. 1A.

The method is performed in the gateway 1 of FIG. 1A. The method is executed for a particular client device and can be executed independently, in parallel, for a plurality of client devices.

In a receive client request step 30, a client request (see 10 of FIGS. 2-4) is received from the client device 2. The client request comprises at least a portion being bound for the application server 3.

In a send server request step 32, an application server request (see 11 of FIGS. 2-4) is sent to the application server to connect to the application server.

In a receive server response step 34, an application server response (see 12 of FIGS. 2-4) is received from the application server. The application server response indicates a need to provide authentication.

In an establish credentials step 36, at least one authentication credential is established using the authentication server for a connection between the client device and the application server. This may comprise the use of a generic bootstrapping architecture as described above. In one embodiment, this comprises receiving a context identifier from the authentication server and deriving a shared key, as explained in more detail below with reference to FIG. 6D.

In a send client response step 38, a client response (see 14 of FIGS. 2-4) is sent to the client device. The client response is based on the application server response and comprises the at least one authentication credential.

The client request, application server request, application server response and client response can e.g. be communicated using HTTP or COAP, either protocol being with or without transport layer security.

Figure 6B:
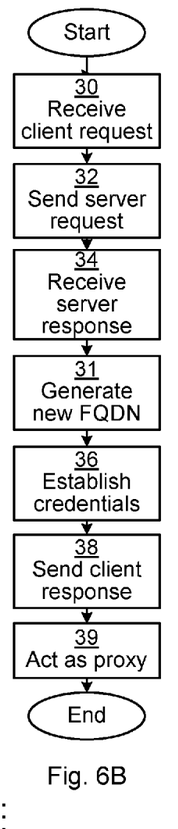

FIG. 6B is a flow chart illustrating one embodiment of a method for facilitating communication between a client device, being one of client devices 2 of FIG. 1A, and an application server being one of the application servers 3 of FIG. 1A. The method of FIG. 6B is similar to the method of FIG. 6A and only steps which are new of modified compared to the method of FIG. 6A are described here. In this embodiment, as explained below, the FQDN (Fully Qualified Domain Name) is modified to include an identity associated with the client device. In this way, the authentication key generated for this session will be bound to the identity of the device for which the key is generated.

After the receive server response step 34, there is here a generate new FQDN (Fully Qualified Domain Name) step 31, in which a new FQDN is generated for the application server. The new FQDN is based on an original FQDN for the application server and an identity associated with the client device.

In one embodiment, the new FQDN is a subdomain of the original FQDN, and the specification of the new FQDN, in relation to the original FQDN, is based on the identity associated with the client device such as a subscriber identity or a hardware identity. Optionally, the identity associated with the client device comprises (or is equal to) an identifier of the client device. For example, if the FQDN for the application server is "as.foo.com" and a client device has an identity x, then the new FQDN can be generated as "x.as.foo.com". Optionally, the identity is not used directly and instead a value y which is derived from x is used, i.e. y=f(x). This would then result in a new FQDN being "y.as.foo.com". By using a derived value for the identity of the client device, the identity of the client device is not explicitly shown, which may be desired for security reasons. The function f may e.g. be a hash function.

Optionally, the new FQDN is used during the establish credentials step 36. Moreover, the new FQDN is used in the communication with the application server 3, whereby the new FQDN forms part of the HTTP/1.1 header. This allows the application server 3 to send this new FQDN, along with the B-TID to the authentication server, after which the authentication server generates the Ks_NAF and sends this back to the application server 3. The Ks_NAF can then be used in communication with the gateway and matches the Ks_NAF derived by the gateway, whereby the Ks_NAF is now based on the new FQDN.

Also, using the new FQDN allows the application server to distinguish between client devices. If this is not required, the application server should still accept and then optionally ignore the client device identity part of the new FQDN.

Optionally, the identity associated with the client device comprises an identifier of an application executing on the client device. This allows the application server to distinguish between applications of the same client device simply using the new FQDN, e.g. in the host field in the header of the server request. Moreover, the applications are securely separated from each other using separate shared keys for communication with the application server 3, even for the same application server 3.

In an act as proxy step 39, the gateway acts as a proxy (implicit or explicit) between the client device and the application server. During this operation as a proxy, traffic is for instance monitored using a filter and acts upon packets matching the filter, e.g. when a HTTP 401 message is received from the application server. This means that the proxy functionality in the gateway does not need to act on packets which do not match the filter. This step may be performed separately and continuously by the gateway.

Figure 6C:
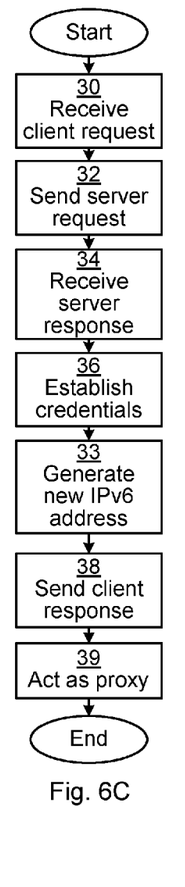

FIG. 6C is a flow chart illustrating one embodiment of a method for facilitating communication between a client device, being one of client devices 2 of FIG. 1A, and an application server being one of the application servers 3 of FIG. 1A. The method of FIG. 6C is similar to the method of FIG. 6A and only steps which are new of modified compared to the method of FIG. 6A are described here. In this embodiment, an IPv6 address to the application server is modified to include data about the client device.

After the establish credentials step 36, there is here a generate new IPv6 (Internet Protocol version 6) address step 33, in which a new IPv6 address for the application server, the client device and/or the gateway is generated based on an original IPv6 address and an identity associated with the client device. More specifically, when the gateway is an implicit proxy, the new IPv6 address can be either for the application server or the client device (since the implicit proxy is transparent). When the gateway is an explicit proxy, the IPv6 address can be for the application server, the client device or the gateway.

In one embodiment, an interface identifier of the new IPv6 address is based on the identity associated with the client device. The IPv6 format allows for an interface identifier of up to 64 bits, which thus can be populated with data based on the identity associated with the client device. Optionally, the identity associated with the client device comprises (or is equal to) an identifier of the client device. Optionally, the identity is not used directly and instead a value y which is derived from x is used, i.e. y=f(x). By using a derived value for the identity of the client device, the identity of the client device is not explicitly shown, which may be desired for security reasons. The function f may e.g. be a hash function, e.g. tailored to generate a 64 bit value.

Also, using the new IPv6 address allows the application server to distinguish between client devices. If this is not required, the application server should still accept and then optionally ignore the client device identity part of the new IPv6 address.

Optionally, the identity associated with the client device comprises an identifier of an application executing on the client device. This allows the application server to distinguish between applications of the same client device simply using the new IPv6 address, e.g. in the host field in the header of the server request.

In an act as proxy step 39, the gateway acts as a proxy (implicit or explicit) between the client device and the application server. During this operation as a proxy, the new IPv6 address is used for identification of, and routing to, the application server.

Figure 6D:
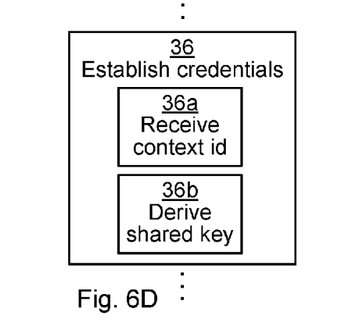

FIG. 6D is a flow chart illustrating one embodiment of the establish credentials step 36 of FIGS. 6A-C.

In this embodiment, the establish credentials step 36 comprises two substeps: a receive context id step 36a and a derive shared key step 36b.

In the receive context id step 36a, a context identifier is received from the authentication server. In GBA, the context identifier is the B-TID (Bootstrapping transaction identifier) which is an (at least in practice) globally unique identifier which is used to bind the subscriber identity to the keying material. The context identifier is used in further communication between the client device and the application server.

In the derive shared key step 36b, a shared key (Ks_NAF in GBA) is derived from a previously stored authentication credential (Ks in GBA). In GBA, Ks_NAF is computed as Ks_NAF=KDF (Ks, "gba-me", RAND, IMPI, NAF_Id), where KDF is the key derivation function as specified in Annex B of 3GPP TS 33.220 V12.0.0, and the key derivation parameters consist of the user's IMPI (IP (Internet Protocol) Multimedia Private Identity), the NAF_Id (identifier of the application server) and RAND (a random or pseudo-random number provided by the authentication server). The keys Ks_ext_NAF and Ks_int_NAF may also be derived in this step as specified in 3GPP TS 33.220 V12.0.0.

The context identifier (e.g. B-TID) and the shared key (Ks_NAF, Ks_int_NAF, and/or Ks_ext_NAF) are then sent to the client device in the send client response step 38.

Figure 7:
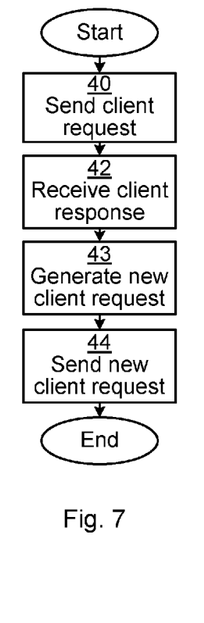
FIG. 7 is a flow chart illustrating a method for setting up a connection between the client device and application server of FIG. 1A.

FIG. 7 is a flow chart illustrating a method for setting up a connection between the client device and application server of FIG. 1A. The method is performed in the client device.

In a send client request step 40, a client request (see 10 of FIGS. 2-4) is sent to the gateway. The client request comprises at least a portion being bound for the application server. In the case of the gateway being an implicit proxy, the whole client request is intended for the application server, while in the case of the gateway being an explicit proxy, the client request can be modified by the gateway, especially the header of the client request.

In a receive client response step 42, a client response (see 14 of FIGS. 2-4) is received from the gateway. However, in the case that the gateway is an implicit proxy, the client response appears to be received from the application server. The client response indicates a need to provide authentication and comprises at least one authentication credential. Moreover, the client response comprises at least one authentication credential. As explained above, the at least one authentication credential is inserted in the client response by the gateway.

In a generate new client request step 43, a new client request (see 15 of FIGS. 2-4) is generated based on the at least one authentication credential. In particular, the client request can contain the context identifier of the at least one authentication credential.

In a send new client request step 44, the new client request is sent to the gateway intended for the application server.

Figure 8:
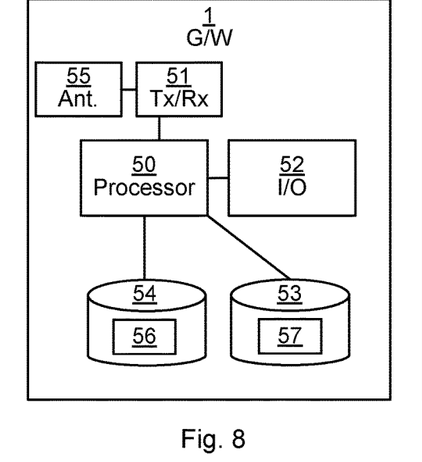
FIG. 8 is a schematic diagram showing some components of the gateway of FIGS. 1A-B.

FIG. 8 is a schematic diagram showing some components of the gateway 1 of FIGS. 1A-B. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIGS. 6A-D above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM). The memory 53 also comprises credentials 57, such as 3GPP credentials, e.g. stored in a USIM. The USIM can be provided using a physical card or by an electronically transferable subscriber identity module such as an MCIM.

The gateway 1 further comprises an I/O interface 52 for communicating with other external entities, e.g. using a wired network connection such as Ethernet. Optionally, the I/O interface 52 also includes a user interface.

The gateway 1 also comprises one or more transceivers 51, comprising analogue and digital components, and a suitable number of antennas 55 for wireless communication with client devices and with radio base stations of a mobile communication network (to thereby gain access to one or more application servers and one or more authentication servers). Optionally, the one or more application servers and one or more authentication servers are instead reachable via a wired IP based network, such as over an Ethernet connection or a wireless IP based network, such as Wi-Fi (any IEEE 802.11x standard).

Other components of the gateway 1 are omitted in order not to obscure the concepts presented herein.

Figure 9:
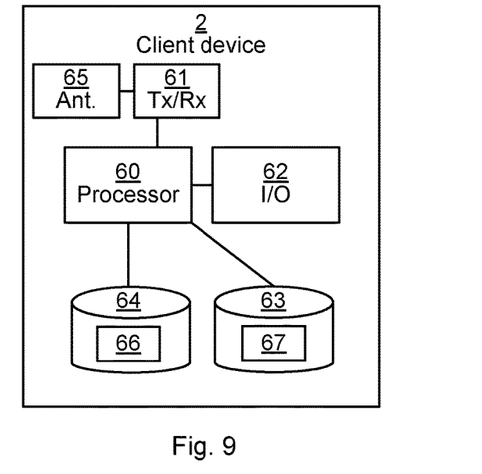
FIG. 9 is a schematic diagram showing some components of the client device of FIGS. 1A-B.

FIG. 9 is a schematic diagram showing some components of the client devices of FIGS. 1A-B, here represented by a single client device 2. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM), e.g. in the form of a persistent storage, which, for example, can be any single one or combination of magnetic memory, optical memory, solid state memory or even remotely mounted memory. The data memory 63 can e.g. store one or more authentication credentials 67 provided by the gateway for use in communication with a particular application server.

The client device 2 further comprises an I/O interface 62 for communicating with other external entities such as the gateway, e.g. using a wired network connection such as Ethernet. The I/O interface can optionally comprise a basic or more complete user interface including any of a display, input devices (input keys, touch sensitivity of the screen, etc.), speaker, microphone, etc.

The client device 2 also comprises one or more transceivers 61, comprising analogue and digital components, and a suitable number of antennas 65 for wireless communication with the gateway.

Other components of the client device 2 are omitted in order not to obscure the concepts presented herein.

Figure 10:
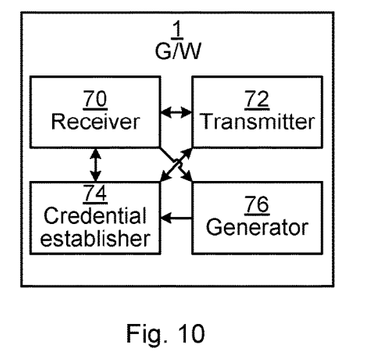
FIG. 10 is a schematic diagram showing functional modules of the gateway of FIGS. 1A-B and 8.

FIG. 10 is a schematic diagram showing functional modules of the gateway 1 of FIGS. 1A-B and 8. The modules can be implemented using software instructions such as a computer program executing in the gateway 1 and/or using hardware, such as application specific integrated circuits, field programmable gate arrays, discrete logical components, transceivers, etc. The modules correspond to the steps in the methods illustrated in FIGS. 6A-D.

A receiver 70 is arranged to receive client requests from client devices and application server responses from an application servers. This module corresponds to the receive client request step 30 and receive server response step 34 of FIGS. 6A-C.

A transmitter 72 is arranged to send application server requests to application servers and client responses to client devices. This module corresponds to the send server request step 32 and send client response step 38 of FIGS. 6A-C.

A credential establisher 74 is arranged to establish credentials with an authentication server. This module corresponds to the establish credentials step 36 of FIGS. 6A-D.

A generator 76 is arranged to generate new FQDNs and or new IPv6 addresses based on an identity associated with the client device, and optionally comprising an identifier of an application executing on the client device. This module corresponds to the generate new FQDN step 31 and generate new IPv6 address step 33 of FIGS. 6B and 6C, respectively.

Figure 11:
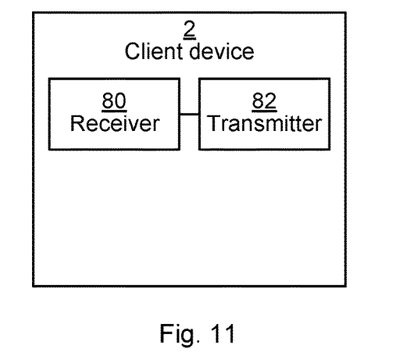
FIG. 11 is a schematic diagram showing functional modules of the client device of FIGS. 1A-B and 9.

FIG. 11 is a schematic diagram showing functional modules of the client device 2 of FIGS. 1A-B and 9. The modules can be implemented using software instructions such as a computer program executing in the client device 2 and/or using hardware, such as application specific integrated circuits, field programmable gate arrays, discrete logical components, transceivers, etc. The modules correspond to the steps in the methods illustrated in FIG. 7.

A receiver 80 is arranged to receive client response from the gateway. This module corresponds to the receive client response step 42 of FIG. 7.

A transmitter 82 is arranged to send client requests. This module corresponds to the send client request step 40 and send new client request step 44 of FIG. 7.

A generator 84 is arranged to generate a new client request based on one or more authentication credentials from the client response. This module corresponds to the generate new client request step 43 of FIG. 7.

Figure 12:
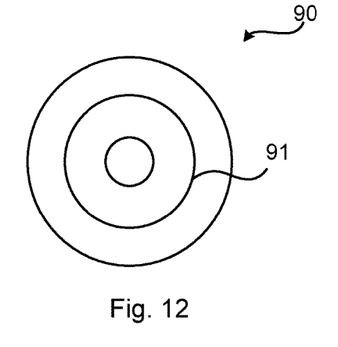
FIG. 12 shows one example of a computer program product 70 comprising computer readable means.

FIG. 12 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 8 or the computer program product 66 of FIG. 9. While the computer program 91 is here schematically shown as a track on the depicted optical disk, the computer program can be stored in any way which is suitable for the computer program product.

Figure 13:
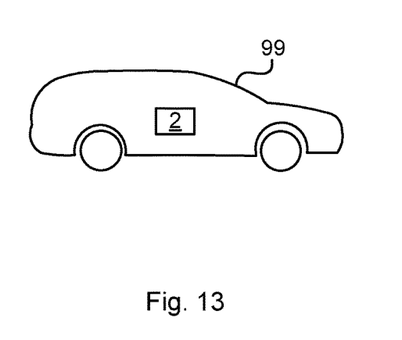
FIG. 13 is a schematic diagram illustrating a vehicle comprising the client device of FIGS. 1A-B, 9 and 11

FIG. 13 is a schematic diagram illustrating a vehicle comprising the client device of FIGS. 1A-B, 9 and 11. The vehicle 99 can be any suitable vehicle for transportation of people and/or goods on land, sea, air or space. The vehicle comprises a client device 2. The client device 2 is explained in more detail above.

In the embodiments presented herein, multiple contexts (e.g. GBA contexts) can be simultaneously maintained between multiple client devices and a single application server using just one set of credentials (e.g. 3GPP credentials). In this way, end-to-end security between devices and the application server is achieved, where each client device connection is protected from other connections using the same gateway, even if communicating with the same application server.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, executed in a gateway, the gateway being arranged to facilitate communication between a client device and an application server, the method comprising the steps of:
   receiving a client request from the client device, the client request comprising at least a portion being bound for the application server;
   sending, in response to the client request, an application server request to the application server;
   receiving an application server response from the application server, the application server response type unconditionally indicating a need to provide authentication;
   in response to the application server response indicating the need to provide authentication, communicating with an authentication server to establish at least one authentication credential that is bound to an identifier associated with the client device, for use by the client device during authentication with the application server; and
   sending a client response to the client device, the client response being based on the application server response and comprising the at least one authentication credential, thereby enabling the client device to authenticate itself with the application server.

2. The method according to claim 1, wherein the step of communicating with the authentication server to establish at least one authentication credential comprises the use of a generic bootstrapping architecture.

3. The method according to claim 1, wherein the at least one authentication credential comprises a context identifier received from the authentication server and a shared key derived by the gateway as a function of an authentication credential previously stored at the gateway, the identifier associated with the client device, an identifier of the application server, and a nonce returned by the authentication server in association with the context identifier.

4. A gateway arranged to facilitate communication between a client device and an application server, the gateway comprising:
   communication circuitry configured for communicating directly or indirectly with a client device and an authentication server; and
   processing circuitry configured to:
   receive a client request from the client device, the client request comprising at least a portion being bound for the application server;
   send, in response to the client request, an application server request to the application server;
   receive an application server response from the application server, the application server response type unconditionally indicating a need to provide authentication;
   in response to the application server response indicating the need to provide authentication, communicate with an authentication server to establish at least one authentication credential that is bound to an identifier associated with the client device, for use by the client device during authentication with the application server; and
   send a client response to the client device, the client response being based on the application server response and comprising the at least one authentication credential, thereby enabling the client device to authenticate itself with the application server.

5. The gateway according to claim 4, wherein the processing circuitry is configured to use a generic bootstrapping architecture to establish the at least one authentication credential.

6. The gateway according to claim 4, wherein the at least one authentication credential comprises a context identifier received from the authentication server and a shared key, and wherein the processing circuitry is configured to derive the shared key as a function of an authentication credential previously stored at the gateway, the identifier associated with the client device, an identifier of the application server, and a nonce returned by the authentication server in association with the context identifier.

7. The gateway according to claim 4, wherein the processing circuitry is configured to generate a new fully qualified domain name (FQDN) for the application server based on an original FQDN for the application server and the identifier associated with the client device, and wherein the processing circuitry is configured to use the new FQDN for identification of the application server when establishing the at least one authentication credential.

8. The gateway according to claim 7, wherein the processing circuitry is configured to generate the new FQDN as a subdomain of the original FQDN, and the specification of the new FQDN, in relation to the original FQDN, is based on the identifier associated with the client device.

9. The gateway according to claim 7, wherein the identifier associated with the client device comprises an identifier of the client device.

10. The gateway according to claim 7, wherein the identifier associated with the client device comprises an identifier of an application executing on the client device.

11. The gateway according to claim 4, wherein the processing circuitry is further configured to: generate a new Internet Protocol version 6 (IPv6) address for the application server based on an original IPv6 address for the application server and the identifier associated with the client device.

12. The gateway according to claim 11, wherein the processing circuitry is configured to generate an interface identifier of the new IPv6 address based on the identifier associated with the client device.

13. The gateway according to claim 4, wherein the processing circuitry is configured to communicate the client request, application server request, application server response and client response using any one or more of the following protocols: Hypertext Transport Protocol and Constrained Application Protocol either protocol being with or without transport layer security.

14. A non-transitory computer-readable medium storing a computer program that, when executed by a processor of a gateway, configures the gateway for facilitating communication between a client device and an application server, the computer program comprising program instructions configuring the gateway to:
receive a client request from the client device, the client request comprising at least a portion being bound for the application server;
send, in response to the client request, an application server request to the application server;
receive an application server response from the application server, the application server response type unconditionally indicating a need to provide authentication;
in response to the application server response indicating the need to provide authentication, communicating with an authentication server to establish at least one authentication credential that is bound to an identifier of the client device, for use by the client device during authentication with the application server; and
send a client response to the client device, the client response being based on the application server response and comprising the at least one authentication credential, thereby enabling the client device to authenticate itself with the application server.

15. A method performed by a device operating as a client with respect to an application server, the method comprising:
sending a client request for the application server, the client request being intercepted or received by a gateway that communicatively couples the client device to the application server;
receiving a client response from the gateway, in response to the gateway device intercepting or receiving a server response sent from the application server in response to the client request, the client response indicating the need for the client device to authenticate itself with respect to the application server and including a credential established for the client by the gateway, the credential comprising a shared key derived by the gateway in dependence on communicating with an authentication server trusted by the application server, and comprising a transaction identifier issued by the authentication server;
sending a new client request for the application server, the new client request including the transaction identifier, and thereby triggering the application server to undertake authentication of the client device; and
performing authentication with the application server, including using the shared key to generate a challenge response to a challenge issued by the application server in response to receiving the transaction identifier in the new client request.

16. A device configured for operating as a client with respect to an application server, the client device comprising:
a processor; and
a memory storing instructions that, when executed by the processor, configure the processor to:
send a client request for the application server, the client request being intercepted or received by a gateway that communicatively couples the client device to the application server;
receive a client response from the gateway, in response to the gateway device intercepting or receiving a server response sent from the application server in response to the client request, the client response indicating the need for the client device to authenticate itself with respect to the application server and including a credential established for the client by the gateway, the credential comprising a shared key derived by the gateway in dependence on communicating with an authentication server trusted by the application server, and comprising a transaction identifier issued by the authentication server;
send a new client request for the application server, the new client request including the transaction identifier, and thereby triggering the application server to undertake authentication of the client device; and
perform authentication with the application server, including using the shared key to generate a challenge response to a challenge issued by the application server in response to receiving the transaction identifier in the new client request.

* * * * *

UNITED STATES PATENT AND TRADEMARK OFFICE
CERTIFICATE OF CORRECTION

PATENT NO. : 9,985,967 B2
APPLICATION NO. : 14/894142
DATED : May 29, 2018
INVENTOR(S) : Salmela et al.

It is certified that error appears in the above-identified patent and that said Letters Patent is hereby corrected as shown below:

On the Title Page

Under item "Notice", Line 3, delete "0 days. days." and insert -- 0 days. --, therefor.

In the Specification

In Column 5, Line 45, delete "11" and insert -- 11. --, therefor.

In Column 6, Line 17, delete "(Wideband Code Division Multiplex)," and insert -- (Wideband Code Division Multiple Access), --, therefor.

In Column 6, Line 25, delete "application servers 2," and insert -- application servers 3, --, therefor.

In Column 6, Line 39, delete "authentication server 3" and insert -- authentication server 5 --, therefor.

In Column 7, Line 24, delete "gateway 2." and insert -- gateway 1. --, therefor.

In Column 7, Line 28, delete "gateway 2." and insert -- gateway 1. --, therefor.

In Column 7, Line 33, delete "en explicit" and insert -- an explicit --, therefor.

In Column 7, Line 60, delete "client device 1." and insert -- client device 2. --, therefor.

In Column 9, Line 42, delete "response," and insert -- response. --, therefor.

In Column 10, Line 44, delete "there is here" and insert -- there is --, therefor.

In Column 11, Line 42, delete "there is here" and insert -- there is --, therefor.
In Column 13, Lines 16-17, delete "read and write memory (RAM)" and insert -- read and write memory (RWM) --, therefor.

Signed and Sealed this
Fourth Day of September, 2018

Andrei Iancu
*Director of the United States Patent and Trademark Office*

CERTIFICATE OF CORRECTION (continued)
U.S. Pat. No. 9,985,967 B2

In Column 13, Line 25, delete "read and write memory (RAM)" and insert -- read and write memory (RWM) --, therefor.

In Column 13, Lines 55-56, delete "read and write memory (RAM)" and insert -- read and write memory (RWM) --, therefor.

In Column 13, Line 64, delete "read and write memory (RAM)" and insert -- read and write memory (RWM) --, therefor.

In Column 14, Line 38, delete "and or" and insert -- and/or --, therefor.